(12) United States Patent
Schoettger et al.

(10) Patent No.: US 7,114,125 B2
(45) Date of Patent: Sep. 26, 2006

(54) INTER-SCO NAVIGATION

(75) Inventors: Chad A. Schoettger, Louisville, CO (US); Frank L. Weil, Boulder, CO (US); Jason A. Heddings, Erie, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 813 days.

(21) Appl. No.: 10/137,901

(22) Filed: May 1, 2002

(65) Prior Publication Data

US 2003/0208604 A1 Nov. 6, 2003

(51) Int. Cl.
*G06F 9/00* (2006.01)
*G06F 3/00* (2006.01)
*G09B 3/00* (2006.01)

(52) U.S. Cl. ............ 715/744; 715/738; 715/740; 709/227; 434/308; 434/350

(58) Field of Classification Search ........... 709/227; 717/104; 715/705, 744, 738, 740; 434/308, 434/118, 350
See application file for complete search history.

(56) References Cited

U.S. PATENT DOCUMENTS

| | | | | |
|---|---|---|---|---|
| 6,162,060 A | * | 12/2000 | Richard et al. | 434/118 |
| 6,755,659 B1 | * | 6/2004 | LoSasso et al. | 434/219 |
| 2002/0099802 A1 | * | 7/2002 | Marsh et al. | 709/220 |
| 2002/0127531 A1 | * | 9/2002 | Kamens et al. | 434/350 |
| 2003/0009742 A1 | * | 1/2003 | Bass et al. | 717/104 |
| 2003/0103069 A1 | * | 6/2003 | Lie et al. | 345/700 |

OTHER PUBLICATIONS

Advanced Distributed Learning, Sharable Content Object Reference Model (SCORM tm), Version 1.2 "The SCORM Content Aggregation Model", Oct. 1, 2001 © 2001, pp. 180.

Advanced Distributed Learning, Sharable Content Object Reference Model (SCORM tm), Version 1.2 "The SCORM Addendums", Nov. 9, 2001, © 2001.

Advanced Distributed Learning, Sharable Content Object Reference Model (SCORM tm), Version 1.2 "The SCORM Run-Time Environment", Oct. 1, 2001, © 2001.

Advanced Distributed Learning, Sharable Content Object Reference Model (SCORM tm), Version 1.2 "The SCORM Overview", Oct. 1, 2001, © 2001.

* cited by examiner

*Primary Examiner*—Raymond J. Bayerl
*Assistant Examiner*—Anita Datta Chaudhuri
(74) *Attorney, Agent, or Firm*—Blakely, Sokoloff, Taylor & Zafman LLP

(57) ABSTRACT

Disclosed are novel methods and apparatus for providing inter-SCO navigation, for example, in SCORM-based courseware. In an embodiment, a method of navigating a course is disclosed. The method includes: launching the course, the course having a plurality of portions including a first portion and a second portion; displaying the first portion of the course; determining when the first portion of the course is exited; upon exiting of the first portion of the course, determining whether the first portion of the course is exited at a beginning of the first portion; if the first portion of the course is exited at the beginning of the first portion, determining whether the first portion is a starting portion of the course in accordance with a course structure format information of the course; if it is determined that the first portion is not the starting portion of the course, launching a previous portion of the course; if the first portion of the course is exited at an end of the first portion, determining whether the first portion is a last portion of the course; and if it is determined that the first portion is not the last portion of the course, launching a next portion of the course.

32 Claims, 4 Drawing Sheets

INTER-SCO NAVIGATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright© 2002, Sun Microsystems, Inc., All Rights Reserved.

FIELD OF INVENTION

The present invention generally relates to the field of navigation in computer-displayed data. More specifically, an embodiment of the present invention provides for inter-SCO (sharable content object) navigation within sharable content object reference model (SCORM) for use in, for example, courseware applications.

BACKGROUND OF INVENTION

As the number of computers increases worldwide, so does their use in educational settings. Many classrooms and libraries now provide access to data that may be located halfway around the world. Instead of a student having to be physically present in a class, the student may now attend a class by utilizing a computer thousands of miles away. Also, training materials can be stored on computers (i.e., digitized) for use at a later time or while mobile.

Computer-based training materials are, however, largely developed on a proprietary (e.g., company-by-company) basis, resulting in high development costs and limited resale value. American companies alone spend billions of dollars a year on the development of training products with little of the investment focused on resale or external product development. To obviate these problem, the advanced distributive learning (ADL) initiative has been developing guidelines to create new markets for training materials, reduce the costs of development, and increase the potential return on investment.

One common way to share educational information is to utilize a learning management system (LMS). An LMS generally includes solutions for cataloging, course registration, provision of a course, tracking (for example, by managers), and accounting. Such an LMS is typically a large software system, which can easily cost over $100,000. In most cases, an LMS is too costly for one user or cannot be run locally on a client's system, which may lack the necessary local resources.

One solution for sharing courseware amongst LMS providers is to use SCORM, which is developed by the ADL. SCORM provides a reference model that defines a Web-based learning content model. Moreover, SCORM provides a set of interrelated technical specifications for creation of shareable content. Generally, a SCORM course consists of SCOs, which represent the lowest level of granularity of content that can be tracked by an element using the SCORM run-time environment.

In accordance with SCORM, navigation within a SCO can be defined by that SCO. A SCO cannot, however, navigate to another SCO. It is generally the responsibility of an LMS to manage the sequencing and navigation amongst SCOs, for example, based on the content structure format (CSF) hierarchy of blocks and SCOs defining the structure of a given course. Accordingly, SCORM requires that a SCORM-compliant course be viewed through an LMS. More specifically, SCORM requires that the LMS have the ability to determine what to deliver and when, and track the student's progress through the learning content.

The ability to easily navigate a course is a critical feature for any user taking a course. Usability studies have found that the ability to move seamlessly from one SCO to another (as if turning pages in a book) is typically preferred by users over other navigation methods. The present implementation of SCORM provides rules for an LMS or content providers (as an API). However, SCORM does not provide any details as to navigation and sequencing of SCOs.

SUMMARY OF INVENTION

The present invention, which may be implemented utilizing a general-purpose digital computer, in certain embodiments, includes novel methods and apparatus to provide inter-SCO navigation solutions. In an embodiment, a method of navigating a course is disclosed. The method includes: launching the course, the course having a plurality of portions including a first portion and a second portion; displaying the first portion of the course; determining when the first portion of the course is exited; upon exiting of the first portion of the course, determining whether the first portion of the course is exited at a beginning of the first portion; if the first portion of the course is exited at the beginning of the first portion, determining whether the first portion is a starting portion of the course in accordance with a course structure format information of the course; if it is determined that the first portion is not the starting portion of the course, launching a previous portion of the course; if the first portion of the course is exited at an end of the first portion, determining whether the first portion is a last portion of the course; and if it is determined that the first portion is not the last portion of the course, launching a next portion of the course.

In another embodiment, the course structure format information of the course is implemented as a manifest.

In a further embodiment, the method may include an act selected from a group comprising updating a launch data field corresponding to the first portion, updating a lesson location field corresponding to the first portion, and/or updating a navigation direction cookie corresponding to the first portion.

In yet another embodiment, the method may include a navigation act selected from a group comprising navigating from a last page of the first portion to a first page of the second portion, navigating from a first page of the first portion to a last page of the second portion, and/or navigating from a first page of the first portion to a first page of the second portion.

BRIEF DESCRIPTION OF DRAWINGS

The present invention may be better understood and its numerous objects, features, and advantages made apparent to those skilled in the art by reference to the accompanying drawings in which.

The use of the same reference symbols in different drawings indicates similar or identical items.

DETAILED DESCRIPTION

In the following description, numerous details are set forth. It will be apparent, however, to one skilled in the art that embodiments of the invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
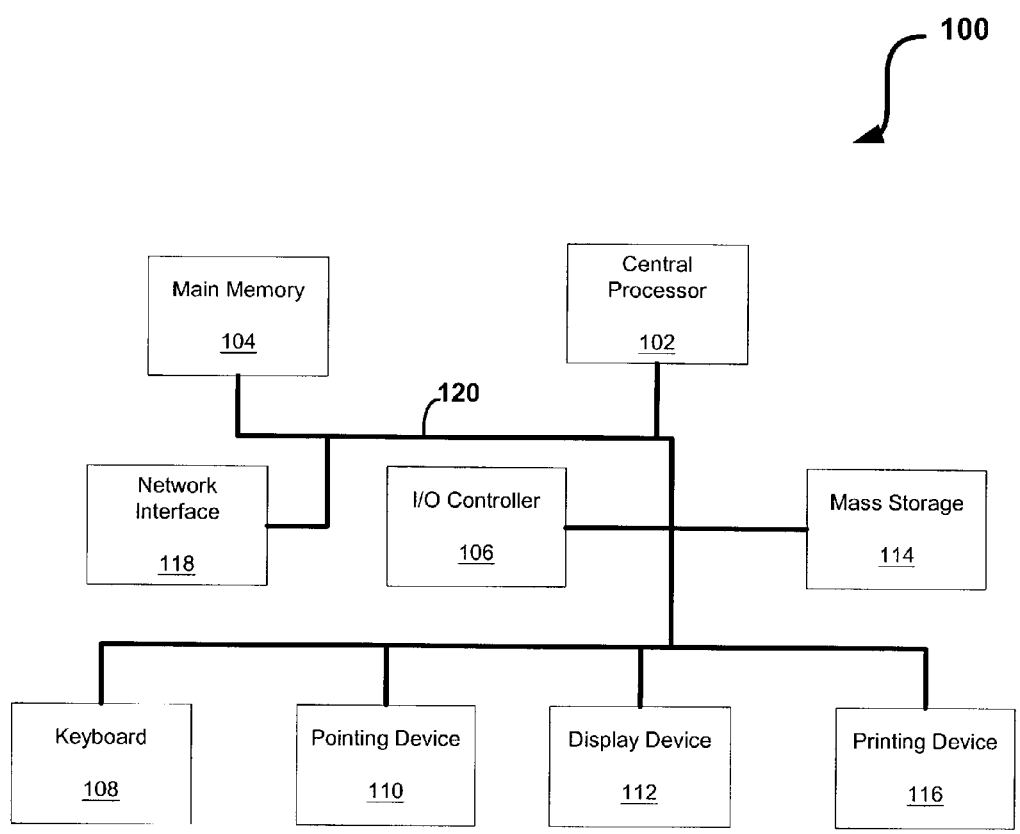
FIG. 1 illustrates an exemplary computer system 100 in which the present invention may be embodied.

FIG. 1 illustrates an exemplary computer system 100 in which the present invention may be embodied in certain embodiments. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk, an optical drive, and the like), and a network interface 118. Additional input/output devices, such as a printing device 116, may be included in the system 100 as desired. As illustrated, the various components of the system 100 communicate through a system bus 120 or similar architecture.

In an embodiment, the computer system 100 includes a Sun Microsystems computer utilizing a SPARC microprocessor available from several vendors (including Sun Microsystems of Palo Alto, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments, the network interface 118 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), and the like. Also, it is envisioned that in certain embodiments, the computer system 100 is a general purpose computer capable of running any number of applications such as those available from companies including Oracle, Siebel, Unisys, Microsoft, and the like.

Figure 2:
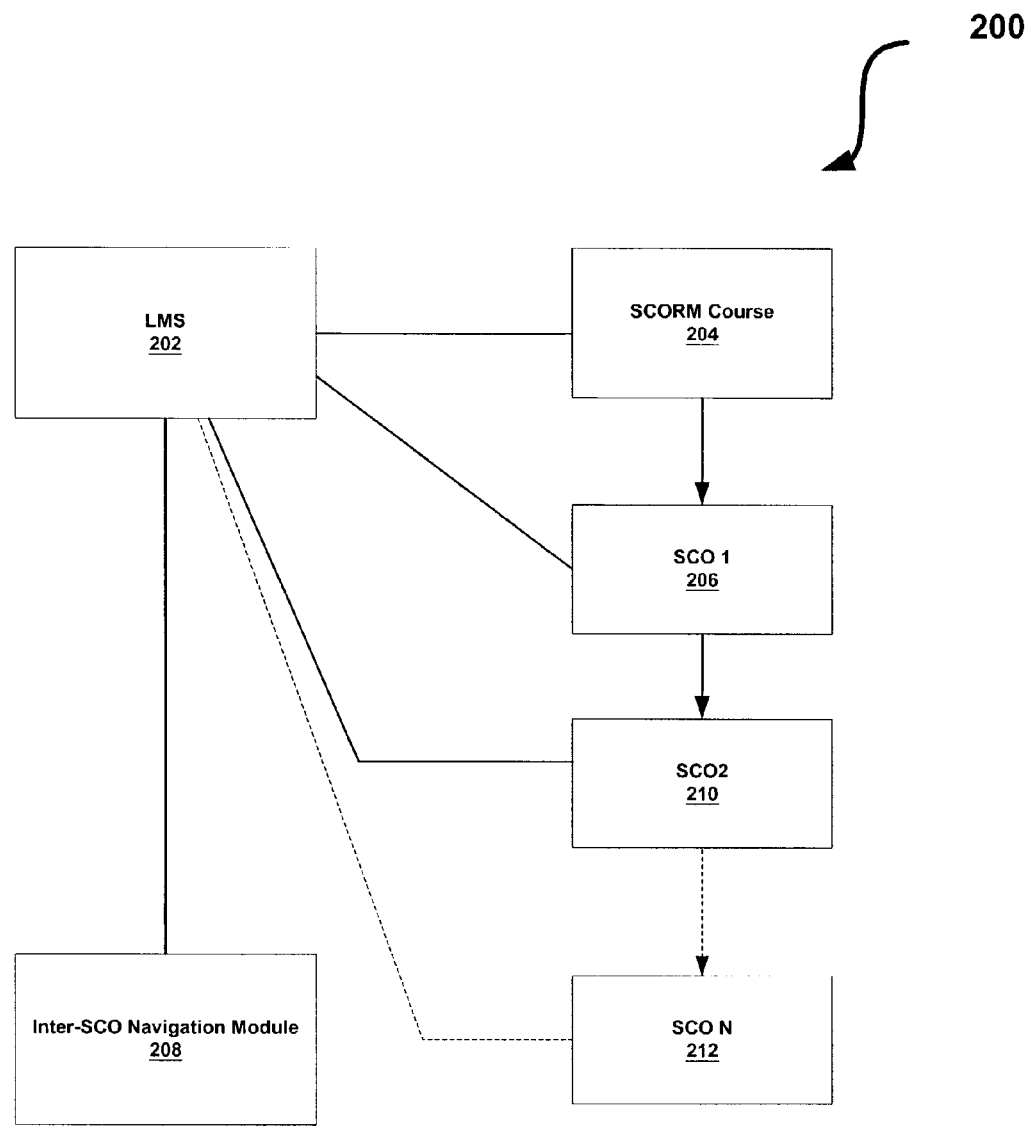
FIG. 2 illustrates an exemplary flow diagram of an inter-SCO navigation system 200 in an accordance with an embodiment of the present invention.

FIG. 2 illustrates an exemplarily flow diagram of an inter-SCO navigation system 200 in an accordance with an embodiment of the present invention. The system 200 includes an LMS 202, which is coupled to and/or communicates with a SCORM course 204, a first SCO 206, an inter-SCO navigation module 208, a second SCO 210, and an $n^{th}$ SCO 212. The SCORM course may be displayed in a browser such as the Internet Explorer (available from Microsoft Corporation of Redmond, Wash.) and Netscape Navigator (available from various sources including iPlanet, now a division of Sun Microsystems, Inc., of Palo Alto, Calif.). Also, in one embodiment, the SCORM course may be stored on a nonvolatile storage device and/or on a network (such as the storage devices and network interfaces discussed with respect to FIG. 1). The SCORM standard is hereby incorporated herein by reference for all purposes. As illustrated in FIG. 2, the LMS 202 has access to the SCORM course 204, for example, to launch the first SCO 206 through the SCORM course 204. The LMS 202 also has access to the first SCO 206, for example, to display the first SCO 206.

Upon completion of the first SCO 206, the LMS may request the inter-SCO navigation module 208 to check for the next SCO to display.

In an embodiment, the inter-SCO navigation module 208 may respond to this request by providing the ID of the next SCO to display. Further details regarding some embodiments of the present invention relating to the inter-SCO navigation module 208 may be found with reference to FIG. 3. In an embodiment, the inter-SCO navigation module 208 may be implemented in JAVA or other suitable programming language. Based on the response from the inter-SCO navigation module 208, the LMS 202 may launch a next SCO (for example, the second SCO 210). In an embodiment, this system may be repeated for numerous SCOs (for example, up to the $n^{th}$ SCO 212). The directional arrows in FIG. 2 are intended to illustrate the navigational flow through the SCORM courseware in one embodiment (e.g., from the first SCO to the second SCO, etc.).

Figure 3:
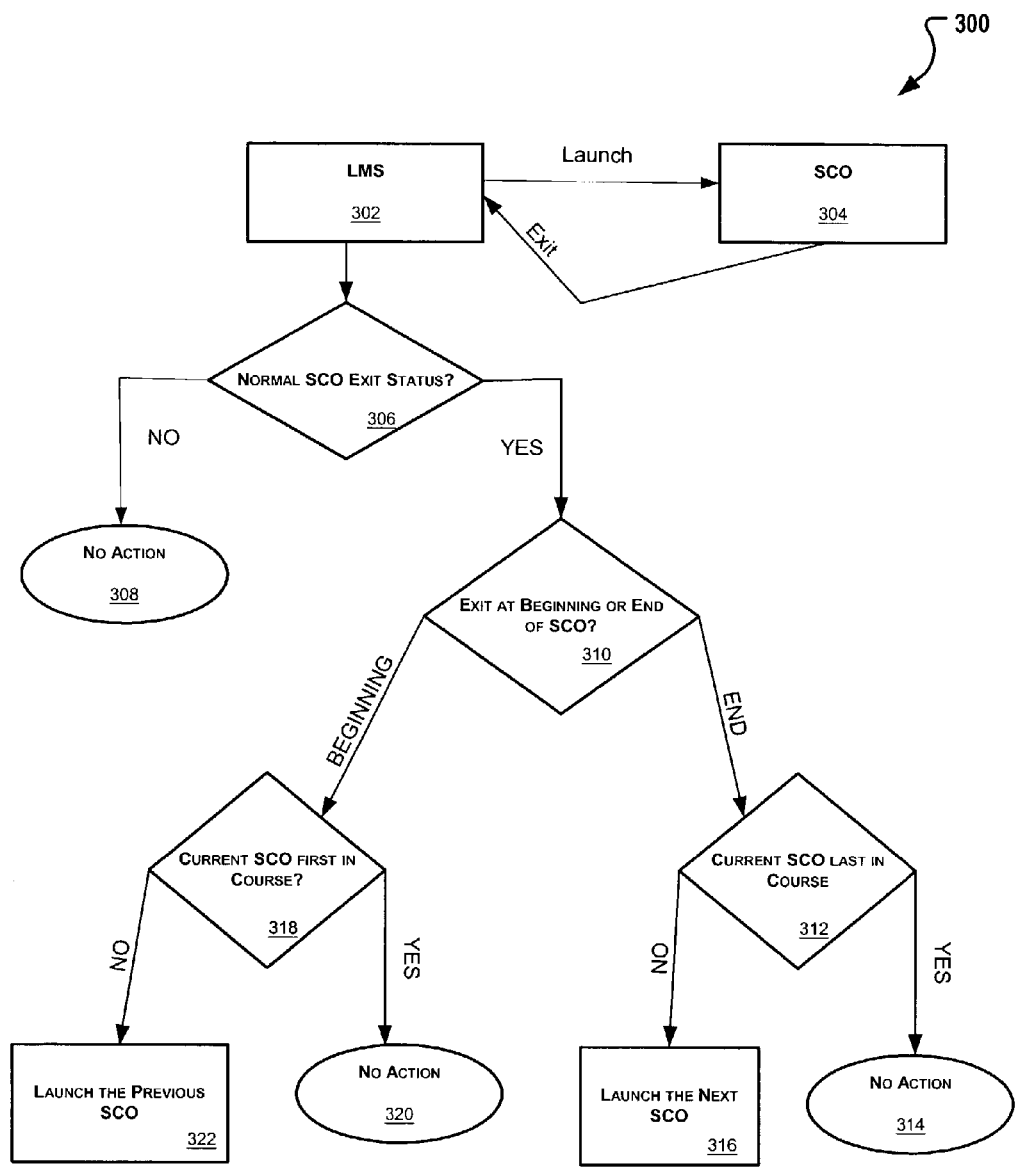
FIG. 3 illustrates an exemplary flow diagram of an inter-SCO navigation method 300 in an accordance with an embodiment of the present invention.

FIG. 3 illustrates an exemplarily flow diagram of an inter-SCO navigation method 300 in an accordance with an embodiment of the present invention. An LMS 302 launches a SCO 304 and once the SCO 304 exists, the LMS 302 determines whether the SCO has exited in a normal fashion in a step 306. In one embodiment, the LMS 302 may be similar to the LMS 202 of FIG. 2. In a further embodiment, the inter-SCO navigation method 300 may be implemented similarly to the inter-SCO navigation module 208 of FIG. 2. It is envisioned that the SCO 304 may be entered in any one of the following states: ab initio (i.e., from the beginning), resume (i.e., resume where left off previously), browse (e.g., where a user has not paid for a license and is merely browsing the courseware), and/or review (i.e., after a user has already finished the course). If the exit status of the SCO 304 is determined to be abnormal in the step 306, then the method 300 ends with no action in a step 308. Alternatively, if the SCO 304 has a normal exit status (as determined the step 306), a step 310 determines whether the SCO has exited at the beginning or the end of the SCO (i.e., determining the direction of navigation).

With respect to the exit status of the step 306, it is envisioned that in an embodiment the exit status may have any of the following statuses: normal which may be indicated by an empty status field in an embodiment (e.g., indicating that the user has navigated to the last page of the SCO), suspend (e.g., resume entry), timeout (e.g. test environment indicating that a user has run out of time while, for example, taking a test), and/or logout (e.g. leaving the whole course). If the step 310 determines that the SCO has exited at the end of the SCO, in a step 312, it is determined whether the current SCO is the last one in the course. In an embodiment, the step 312 can be performed by utilizing the CSF hierarchy of blocks and SCOs.

More specifically, the CSF file of SCORM version 1.1 has been replaced with a manifest in SCORM version 1.2. Accordingly, in one embodiment, it is envisioned that the utilization of CSF herein is equally applicable to utilizing a manifest instead. Moreover, it is envisioned that this CSF information may be stored in a database in one embodiment. In accordance with an embodiment of the present invention, a database is envisioned to include any collection of data that is organized for collection and/or retrieval. If the current SCO is determined to be the last one in the course (in the step 312), the method 300 ends with no action in step 314. Alternatively, if the current SCO is not the last SCO in the course, a step 316 launches the next SCO.

If the SCO 310 determines that the SCO has exited at the beginning of the SCO, a step 318 determines whether the current SCO is the first one in the course. In an embodiment, the step 318 can be performed by utilizing the CSF hierarchy of blocks and SCOs. Moreover, it is envisioned that this CSF information may be stored in a database in one embodiment. The method 300 ends in a step 320 if the step 318 determines that the current SCO is in fact the first SCO in the course (i.e., cannot go back). If the answer to the step 318 is "no," the method 300 continues with a step 322, which launches the previous SCO. Alternatively, the method 300 may include an optional step, which updates the previous SCO's launch data field (e.g., indicating where the SCO should start next time it is launched). In a further embodiment, an optional step may include updating a lesson location field (e.g., indicating where a lesson was left off).

In yet another embodiment, an optional step may employ a cookie to manage the direction of navigation and/or desired starting page in the SCO. In addition, with respect to the optional steps (e.g., the updating of the launch data field), the following three indicators may be utilized: first (e.g., SCO being launched to start on the first page of the SCO), last (e.g., SCO being launched to start on the last page of the SCO, such as when navigating backwards through a SCO), and last visited (e.g., SCO being launched to start on the last visited page (such as a book-marked page) if one exists and is appropriate given the current state of the SCO). In an embodiment, the navigation direction and/or sequencing of SCOs may be determined in accordance with the CSF of the respective courseware.

Figure 4:
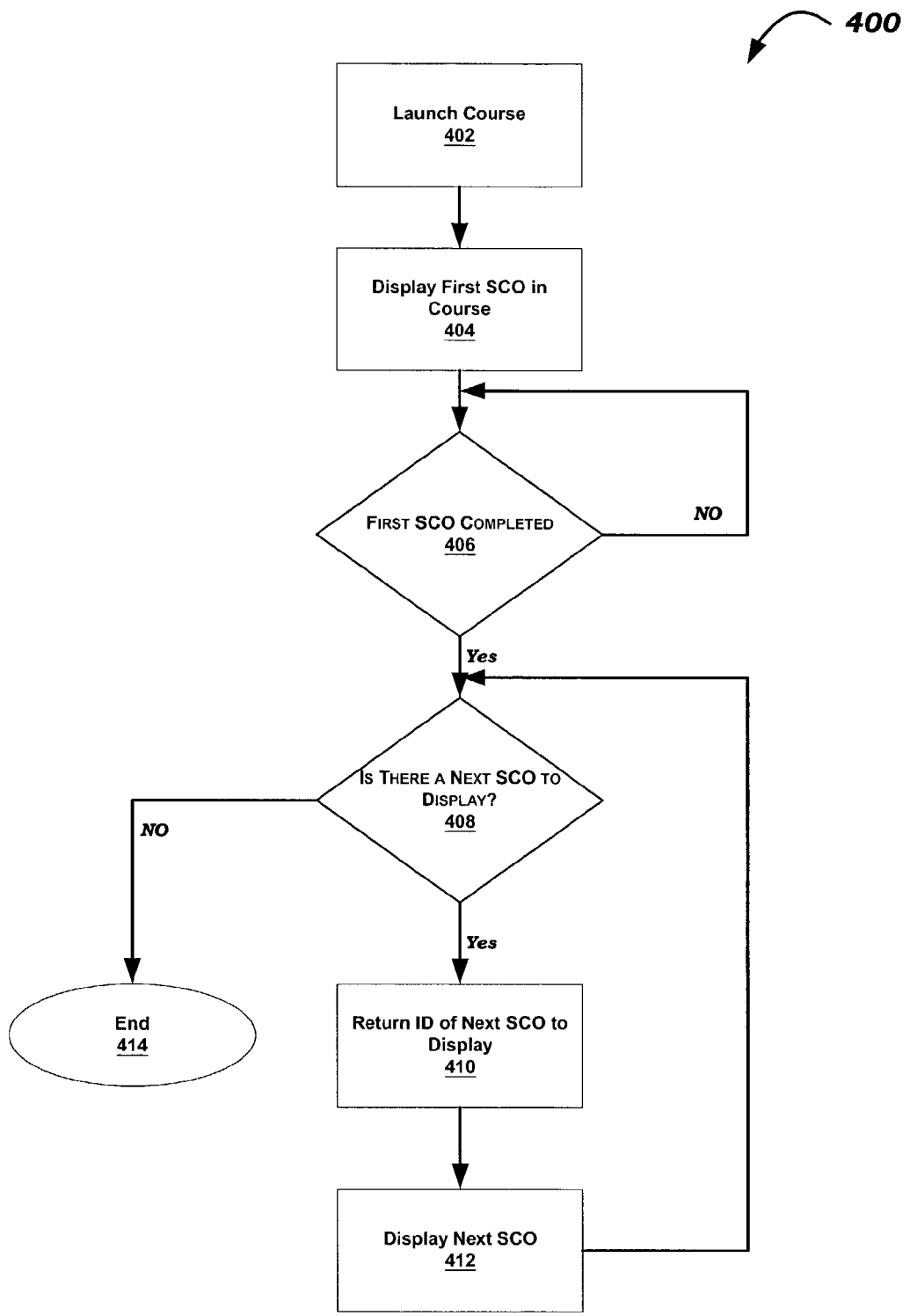
FIG. 4 illustrates an exemplary flow diagram of an inter-SCO navigation method 400 in an accordance with an embodiment of the present invention.

FIG. 4 illustrates an exemplarily flow diagram of an inter-SCO navigation method 400 in an accordance with an embodiment of the present invention. In a step 402, the method 400 starts by launching a course. In an embodiment, the course may be launched as detailed with respect to FIG. 2. In a step 404, the first SCO in the course is displayed. In a step 406, it is determined whether the first SCO is completed. If the first SCO is not completed yet, the method 400 returns to the step 406. Once the step 406 determines that the first SCO is completed, a step 408 determines whether there is a next SCO to display. The step 408 may be implemented, in an embodiment, similarly to the method 300 discussed with respect to FIG. 3 and/or the inter-SCO navigation module 208 of FIG. 2. If the response to the step 408 is "no," the method 400 ends in a step 414. Otherwise, if it is determined (by the step 408) that there remains a next SCO to display, a step 410 returns the ID of the next SCO to display. In an embodiment, the inter-SCO navigation module 208 of FIG. 2 may perform the step 410. Then, a step 412 displays the next SCO. The method 400 continues by returning to the step 408, until there are no more SCOs to display (i.e., reaching the step 414).

Accordingly, the present invention, in an embodiment, defines a method for navigating seamlessly to a next or a previous SCO as defined by CSF of a SCORM-based course. Another embodiment of the present invention may be utilized by an LMS or any other software entity, which provide support for SCORM courseware. In one embodiment, once the current SCO has been exited, the method checks the exit status of the SCO, if the exist status is not "logout," the method launches and displays the next SCO as defined by the CSF. If the current SCO is the last SCO of the course, no action may be taken in accordance with an embodiment of this method.

In another embodiment, the present invention provides a method of navigating from a current SCO to a previous SCO as defined by the CSF. In particular, upon existing the current SCO, the exit status of the SCO is checked. If that status is "logout," no further action may be taken. For all other exit statuses, the method may examine the suspend data of the SCO which has just been exited. If the method determines, based on the suspend data value, that the SCO has exited at the start of the SCO, the method obtains the previous SCO (as defined by the CSF) and may update the SCO's launch data field to denote to the SCO that when it is launched next time it should position itself at its end. The method then launches and displays the SCO. Alternatively, if the current SCO is the first SCO of the course (i.e., no previous SCO exists), no action may be taken by the method.

In a further embodiment, if there is a normal exit status for a SCO (e.g., with respect to the steps 306 and 310 of FIG. 3), an LMS may compare the exiting SCO's lesson location field against its launch location field, for example, in the CSF. If these two values match and the lesson status is incomplete and/or browsed, the LMS may navigate to the previous SCO. If there is no match or the lesson status has any other value, navigation to the next SCO may be assumed (e.g., as a default value). Furthermore, in an embodiment, the SCO may ensure that the lesson location field is set to the launch location upon exiting from the first page. Otherwise, a forward-only navigation may be assumed (e.g., as a default value).

In yet a further embodiment, the navigation may include going from a last page of one SCO to the first page of the next SCO. In an alternate embodiment, the navigation may include going from the first page of one SCO to either the last page of the previous SCO or the first page of the previous SCO. It is envisioned that some content providers may decide that a SCO should only be entered at the beginning. In one embodiment, the SCO ultimately has the final say on which page to navigate to first (e.g., once that SCO is launched).

The foregoing description has been directed to specific embodiments. It will be apparent to those with ordinary skill in the art that modifications may be made to the described embodiments, with the attainment of all or some of the advantages. For example, the techniques of the present invention may be applied to computer-based and/or electronic gaming technologies. Therefore, it is the object of the appended claims to cover all such variations and modifications as come within the spirit and scope of the invention.

What is claimed is:

1. A method of navigating a course, the method comprising:
    launching the course, the course provided in accordance with a sharable content object reference model (SCORM) standard and having a plurality of portions including a first portion and a second portion that are implemented as sharable content objects (SCOs);
    displaying the first portion of the course;
    determining when the first portion of the course is exited;
    upon exiting of the first portion of the course, determining whether the first portion of the course is exited at a beginning of the first portion;
    if the first portion of the course is exited at the beginning of the first portion, determining whether the first portion is a starting portion of the course in accordance with a course structure format information of the course;
    if it is determined that the first portion is not the starting portion of the course, launching a previous portion of the course;
    if the first portion of the course is exited at an end of the first portion, determining whether the first portion is a last portion of the course; and
    if it is determined that the first portion is not the last portion of the course, launching a next portion of the course.

2. The method of claim 1 further including an act selected from a group comprising updating a launch data field corresponding to the first portion, updating a lesson location field corresponding to the first portion, and updating a navigation direction cookie corresponding to the first portion.

3. The method of claim 2 wherein if updating a launch data field is performed, the launch data field stores an indicator selected from a group comprising first, last, and last visited.

4. The method of claim 1 wherein the course structure format information of the course is implemented as a manifest.

5. The method of claim 1 wherein the course structure format information is provided in accordance with a course structure format (CSF) of the SCORM standard.

6. The method of claim 1 wherein the course structure format information is provided in accordance with a manifest of the SCORM standard.

7. The method of claim 1 wherein the course structure format information is stored in a database.

8. The method of claim 1 wherein the launching of the course has an entry state selected from a group comprising ab initio, resume, browse, and review.

9. The method of claim 1 further including providing an ID of the next portion of the course to be launched.

10. The method of claim 1 wherein a learning management system (LMS) launches the course.

11. The method of claim 1 wherein the course is provided through an item selected from a group comprising a non-volatile storage device and a communication link.

12. The method of claim 11 wherein if the course if provided through the communication link, then the communication link is established through a connection selected from a group comprising Ethernet, Fast Ethernet, WAN, leased line, analog modem, OC3, DSL, cellular, TDM, ATM, satellite, cable modem, USB, and FireWire.

13. The method of claim 1 wherein the course is displayed in a browser.

14. The method of claim 13 wherein the browser is selected from a group comprising Internet Explorer and Netscape Navigator.

15. The method of claim 1 further including a navigation act selected from a group comprising navigating from a last page of the first portion to a first page of the second portion, navigating from a first page of the first portion to a last page of the second portion, and navigating from a first page of the first portion to a first page of the second portion.

16. An article of manufacture comprising:
    a machine readable storage medium that provides instructions that, if executed by a machine, will cause the machine to perform operations including:
        launching a course, the course provided in accordance with a sharable content object reference model (SCORM) standard and having a plurality of portions including a first portion and a second portion that are implemented as sharable content objects (SCOs);
        displaying the first portion of the course;
        determining when the first portion of the course is exited;
        upon exiting of the first portion of the course, determining whether the first portion of the course is exited at a beginning of the first portion;

if the first portion of the course is exited at the beginning of the first portion, determining whether the first portion is a starting portion of the course in accordance with a course structure format information of the course;

if it is determined that the first portion is not the starting portion of the course, launching a previous portion of the course;

if the first portion of the course is exited at an end of the first portion, determining whether the first portion is a last portion of the course; and if it is determined that the first portion is not the last portion of the course, launching a next portion of the course.

17. The article of claim 16 wherein the operations further include an act selected from a group comprising updating a launch data field corresponding to the first portion, updating a lesson location field corresponding to the first portion, and updating a navigation direction cookie corresponding to the first portion.

18. The article of claim 16 wherein the course structure format information of the course is implemented as a manifest.

19. The article of claim 16 wherein the operations further include providing an ID of the next portion of the course to be launched.

20. The article of claim 16 wherein a learning management system (LMS) launches the course.

21. The article of claim 16 wherein the course is displayed in a browser.

22. The article of claim 21 wherein the browser is selected from a group comprising Internet Explorer and Netscape Navigator.

23. The article of claim 16 wherein the operations further include a navigation act selected from a group comprising navigating from a last page of the first portion to a first page of the second portion, navigating from a first page of the first portion to a last page of the second portion, and navigating from a first page of the first portion to a first page of the second portion.

24. An apparatus for navigating a course, the apparatus comprising:
   first launching means for launching the course, the course provided in accordance with a sharable content object reference model (SCORM) standard and having a plurality of portions including a first portion and a second portion that are implemented as sharable content objects (SCOs);
   means for displaying the first portion of the course;
   first determining means to determine when the first portion of the course is exited;
   upon exiting of the first portion of the course, second determining means to determine whether the first portion of the course is exited at a beginning of the first portion;
   if the first portion of the course is exited at the beginning of the first portion, third determining means to determine whether the first portion is a starting portion of the course;
   if it is determined that the first portion is not the starting portion of the course, second launching means to launch a previous portion of the course;
   if the first portion of the course is exited at an end of the first portion, fourth determining means to determine whether the first portion is a last portion of the course; and
   if it is determined that the first portion is not the last portion of the course, third launching means to launch a next portion of the course.

25. The apparatus of claim 24 further including means for navigation selected from a group comprising first navigation means for navigating from a last page of the first portion to a first page of the second portion, second navigation means for navigating from a first page of the first portion to a last page of the second portion, and third navigation means for navigating from a first page of the first portion to a first page of the second portion.

26. An apparatus for navigating a course, the apparatus comprising:
   a learning management system (LMS), the LMS launching the course, the course provided in accordance with a sharable content object reference model (SCORM) standard and having a plurality of portions including a first portion and a second portion that are implemented as sharable content objects (SCOs); and
   an navigation module coupled to the LMS, the navigation module performing tasks including:
      upon exiting of the first portion of the course, determining whether the first portion of the course is exited at a beginning of the first portion;
      if the first portion of the course is exited at the beginning of the first portion, determining whether the first portion is a starting portion of the course in accordance with a course structure format information of the course;
      if it is determined that the first portion is not the starting portion of the course, launching a previous portion of the course;
      if the first portion of the course is exited at an end of the first portion, determining whether the first portion is a last portion of the course; and
      if it is determined that the first portion is not the last portion of the course, launching a next portion of the course.

27. The apparatus of claim 26 wherein the course structure format information of the course is implemented as a manifest.

28. The apparatus of claim 26 wherein the course structure format information is stored in a database.

29. The apparatus of claim 26 wherein the course is provided through an item selected from a group comprising a nonvolatile storage device and a communication link.

30. The apparatus of claim 29 wherein if the course if provided through the communication link, then the communication link is established through a connection selected from a group comprising Ethernet, Fast Ethernet, WAN, leased line, analog modem, OC3, DSL, cellular, TDM, ATM, satellite, cable modem, USB, and FireWire.

31. The apparatus of claim 26 further including a browser to display the course.

32. The apparatus of claim 31 wherein the browser is selected from a group comprising Internet Explorer and Netscape Navigator.

* * * * *